Dec. 31, 1963    G. E. MEGEL ETAL    3,115,800
GUIDING DEVICES FOR GUIDING A WORK BAR TO BE
MACHINED ON AN AUTOMATIC LATHE
Filed April 11, 1960    3 Sheets-Sheet 2

INVENTORS
GUILLAUME E. MEGEL
HENRI MANCJA
By
Wenderoth, Lind & Ponack
Attys.

Dec. 31, 1963  G. E. MEGEL ETAL  3,115,800
GUIDING DEVICES FOR GUIDING A WORK BAR TO BE
MACHINED ON AN AUTOMATIC LATHE
Filed April 11, 1960  3 Sheets-Sheet 3

INVENTORS
GUILLAUME E. MEGEL
HENRI MANCIA
By Wenderoth, Lind & Ponack
Attys.

United States Patent Office 3,115,800
Patented Dec. 31, 1963

3,115,800
GUIDING DEVICES FOR GUIDING A WORK BAR TO BE MACHINED ON AN AUTOMATIC LATHE
Guillaume Ernest Megel and Henri Mancia, Moutier, Switzerland, assignors to Usines Tornos Fabrique de Machines Moutier S.A., Moutier, Switzerland, a Swiss company
Filed Apr. 11, 1960, Ser. No. 21,530
Claims priority, application Switzerland Apr. 24, 1959
7 Claims. (Cl. 82—38)

In known automatic lathes having a moving headstock operating on bar stock, the bar which is machined on the headstock is rotated about its axis by a collet chuck which is carried in a spindle which is rotatably journalled in the headstock and driven by suitable means. The leading end of the bar is machined by tools or cutters fixed to tool carriers themselves mounted fanwise and slidably on a fixed support. During each cycle of operation of these tools a workpiece is produced which when complete is cut off by a parting tool. The bar is then automatically fed forward by an amount corresponding to the axial length of the workpiece. By this forward movement the corresponding portion of the bar is brought into the range of action of the tools and the cycle of operations recommences. The feed of all the tool carriers as well as of the feed of the bar during the machining periods is effected by cams fixed on one or two cam shafts, the cams being arranged so as to come into action in a succession determined by the cycle or operations necessary for the production of the workpiece.

To ensure high precision machining of the forward end of the bar it is essential that this end of the bar should be centered and guided. For this purpose automatic lathes of the kind above described have been provided with a guide device comprising a hollow member in which the bar fits with some play. The front end of this hollow member has radial slots which convert it into a guide collet (in contradistinction to the aforesaid collet chuck in the moving headstock) provided with jaws having certain elasticity. This hollow member is lodged in a fixed sleeve rigidly secured in the tool holder support and constructed to enable the guide collet to be retracted by a rearward longitudinal movement to bring its jaws into guiding position in contact with the bar to be guided.

It will be clear that in this guiding device the precision of machining depends directly on the clearance given to the bar in this guide collet. This clearance naturally increases as a result of wear caused by the rotation and the longitudinal displacement of the bar to be machined which obliges the user of the automatic lathe to effect frequent adjustment. To mitigate this inconvenience it has been proposed to provide the guiding surfaces of the guide collet with linings of hard metal or to rotate the sleeve in which the hollow member and the part thereof forming the guide collet are lodged, in a bearing fixed to the tool holder support. Either of these solutions leaves something to be desired and substantially increases the cost of the automatic lathe.

Another inconvenience which results from adjustment to a sliding fit of the bar to be machined in the guide collet integral with the sliding hollow member is found in the case in which rapid feed of the bar is employed during the cycle of machining operations. This step is generally used if the bar to be machined is not subjected to any cutting operation over some length. Such rapid feed is faster and therefore more advantageous than that effected by a cam. This feed operation consists in freeing the bar that is to say opening the collet chuck rotatably mounted in the moving headstock so that the bar which is subjected to the action of a member such as a counterweight acting on a plunger is fed forward through the open collet chuck and the sliding hollow member up to a stop which may be formed for example by an abutment which is presented at the required moment in front of the tools in the axis of the bar to be machined. The inconvenience of this system resides in the fact that to avoid braking of the bar to be machined during its axial displacement or even premature stopping of the bar before it reaches the stop it is necessary to provide adequate clearance for the bar in the guide collet integral with the sliding hollow member which is naturally detrimental to the precision of machining.

An object of the invention is to provide a guiding device of the general character above described which mitigates the inconveniences above mentioned. This guiding device comprises a sleeve fixed to the support for the tool holders of the lathe which are operated by means of cams fixed on a cam shaft and a sliding hollow member lodged in the sleeve, this sliding hollow member being integral at its forward end with a guide collet in which the bar to be machined can engage with a guiding clearance which can be regulated in advance, and which collet can be opened and reclosed at each cycle of operations of the tool holders by a longitudinal movement of the hollow member forwards and backwards.

According to the invention this device is characterised in that the reciprocating movement of the hollow member is effected by means of a rotatable operating member coupling together the rear ends of the hollow member and the sleeve serving as a lodgement for the hollow member, and adapted to be operated from a cam fixed on the cam shaft corresponding to one cycle of operations of the lathe and under the action of a return spring, on a rocker the rocking movement of which is transmitted to the said rotatable operating member.

The accompanying drawings show by way of example one embodiment of the guiding device according to the invention and three detail modifications of the construction.

Figure 1:
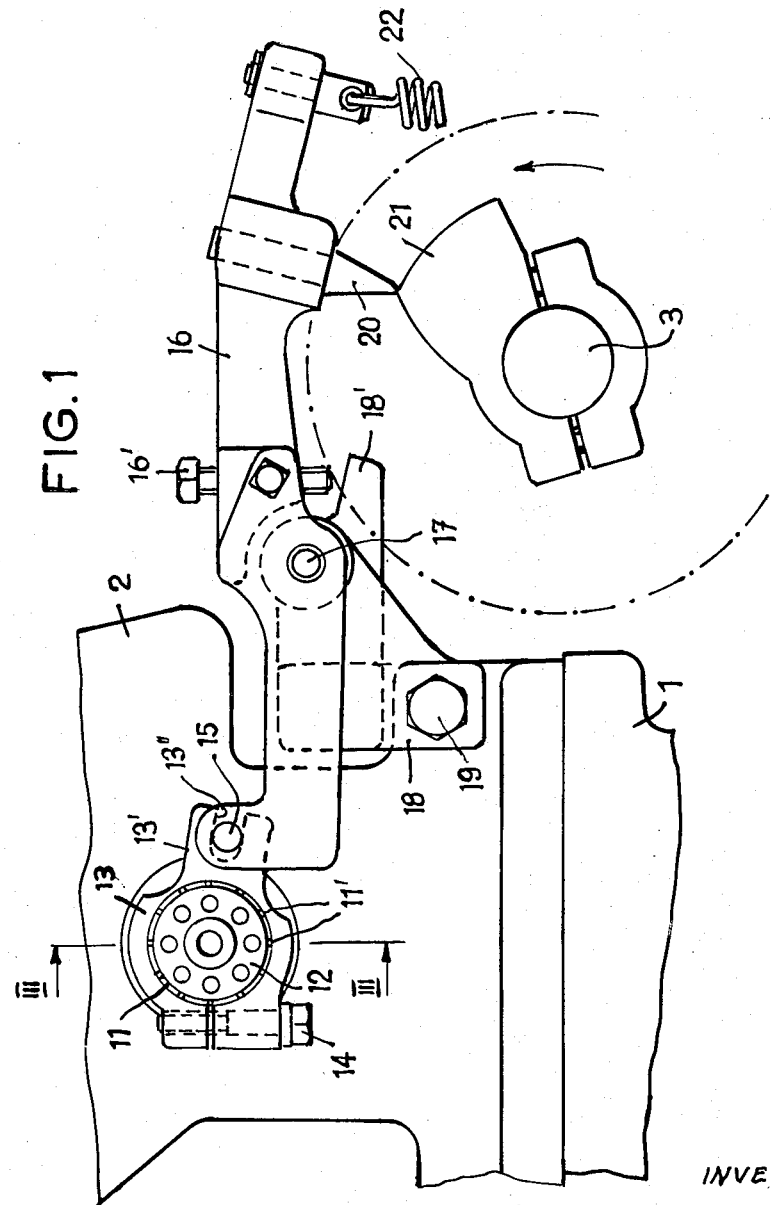
FIGURE 1 is an elevation of the device according to the invention applied to an automatic lathe with a moving headstock, only these parts involved by the application of the invention being shown.

In FIGURE 1 the bed of an automatic lathe having a moving headstock is marked 1 and a support fixed to this bed and on which the tool carriers, not shown, of the lathe are slidably mounted in fan disposition is marked 2. In the tool carriers are fixed the tools serving for machining the bar which is rotated by means of a collet chuck rotatably journalled in the movable headstock and driven by suitable means. Since the collet chuck and movable headstock in which it is journalled are in themselves not part of the invention they are not shown in the drawings in order to avoid unnecessary complication.

As mentioned above the movement of the tool holders and the forward movement of the bar stock during the machining periods is effected by cams fixed on a cam shaft marked 3 in FIGURE 1. As has already been mentioned, to ensure high precision of machining of the forward end of the bar, the automatic lathe is provided according to the invention with a device for guiding and centering the bar and this device will now be described.

Figure 3:
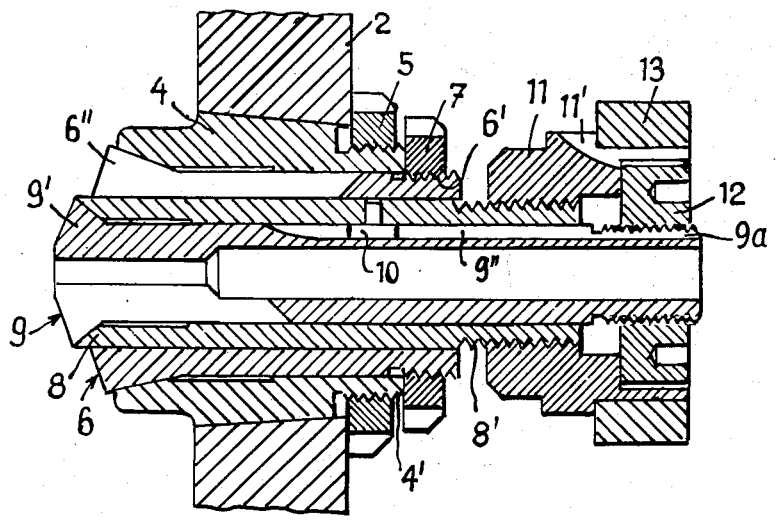
FIGURE 3 is a longitudinal section on the line III—III of FIGURE 1 on a larger scale.

A conical sleeve 4 (FIGURE 3) is engaged in a conical bore in the support 2 and has a threaded cylindrical rear portion 4' upon which is threaded a nut 5 bearing against the rear face of the support 2 to secure the conical sleeve 4 firmly in the latter. This sleeve serves as a housing for an auxiliary collet 6 having radial slots 6" extending back from its forward end by which means elastically mounted jaws are formed. The front end of the collet 6 is conical and engages in the forward part of the sleeve 4 which has a corresponding socket. The rear portion 6' of the collet 6 is also threaded and carries a nut 7 which enables this collet to be tightened by drawing it backwards thereby to grip within it a sleeve 8 for which it serves as a seating. This arrangement enables the precise longitudinal position of the sleeve 8 to be adjusted.

The sleeve 8 again has a socketed forward end and a threaded part 8' at the rear. In this sleeve 8 is lodged a slidable hollow member 9 the forward end of which is constructed to form a guide collet 9' to guide the work bar not shown passing through the hollow member. The collet 9' also has a conical forward end which seats in a socket in the sleeve 8. To prevent the hollow member 9 from rotating in relation to the sleeve 8 it has a longitudinal groove 9" in which engages a key 10 fixed to the inside of the sleeve 8. The rear part 9a of the hollow member is threaded and the pitch of this thread is less than i.e. different from that on the rear part 8' of the sleeve 8.

On the threaded part 8' of the sleeve 8 is threaded a hollow member having a threaded part 11 while a cylindrical nut 12 is threaded on the threaded part 9a of the sliding hollow member 9. The cylindrical rear portion of the hollow part 11 is provided with a plurality of radial slots 11' thereby affording it some elasticity. On this cylindrical portion is fitted a slotted ring 13 which can be tightened by means of a bolt 14 (FIGURE 1). The tightening of this ring 13 causes a slight contraction of the rear portion of the hollow part 11 so that the three members 11, 12 and 13 are rigidly secured together to form a combined nut member with two internal threads of different pitches.

Figure 2:
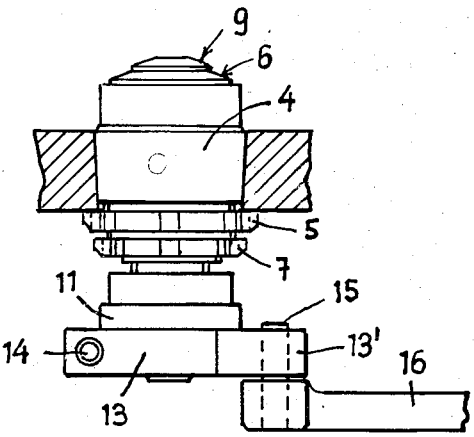
FIGURE 2 is a plan view of part of the device.

The ring 13 also has a radial portion 13' provided with a radial slot 13" in which is engaged a lateral pin 15 (see also FIGURE 2) fixed to one end of a rocker 16 pivoted at 17 on a supporting arm 18 fixed to the tool holder support 2 by means of a bolt 19. The opposite arm of the rocker to that carrying the pin 15 is provided with a follower with a tapered end 20 by which it cooperates with a cam 21 fixed on the cam shaft 3. During the rotation of this shaft in the direction of the arrow indicated in FIGURE 1 the cam 21 acting on the follower 20 causes the rocker 16 to rock against the action of a return spring 22. This rocking movement is transmitted to the ring 13 so as to rotate the combine nut member 11, 12, 13 on the two threads on the parts 8', 9a. As the sleeve 8 is fixed as above mentioned while the hollow member 9 can slide longitudinally within the sleeve 8 and as above mentioned the threads on the sleeve and on the hollow member are of different pitches the hollow member 9 is displaced forwardly by an amount which is just sufficient to allow the guide collet 9' to open slightly. From this moment on the work bar can move freely forward in the guide collet. When the rise of the cam 21 leaves the follower 20, the return spring 22 rocks the rocker 16 in the opposite direction. The combined nut member is thus rotated in the opposite direction and the hollow member 9 now makes a rearward movement to restore the guide collet 9' to its guiding position. It will thus be seen that by longitudinal reciprocating movement of the hollow member 9 within the sleeve 8 due to rotation in one direction and the other of the combined nut member 11, 12, 13 itself operated from the cam shaft 3, the guide collet is caused to open and to close again at each rotation of the operating cam 21. Since as above mentioned all the machining operations and the forward feed of the work bar are effected from the cam shaft 3 the synchronization of all these movements including the opening and closing of the guide collet 9' is only a matter of choice of cams and their angular adjustment of the shaft 3.

As may be seen in FIGURE 1 the rocker 16 is provided with a stop screw 16' cooperating with a lug 18' integral with the support 18 and enabling the rocking of the rocker 16 when it is not under the action of the cam 21 to be limited in a regulatable manner. It will also be seen that by loosening the bolt 14 the nut member 11, 12, 13 can be adjusted on the threaded part of the sleeve 8 thereby to adjust very precisely the guiding clearance to be given to the work bar in the guide collet 9'.

It will also be clear that the rocker 16 can be actuated by connecting it by some means to one of the rockers not shown effecting the opening and closing of the collet chuck in the moving headstock which again would ensure synchronization of the machining operations with the opening and closing of the guide collet 9'.

Figure 4:
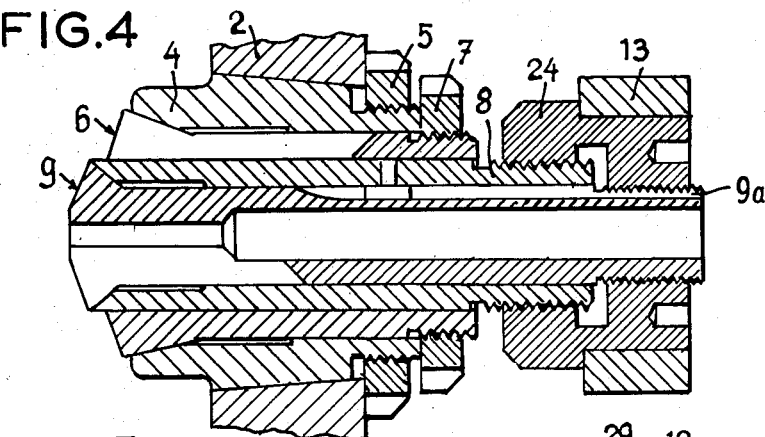
FIGURES 4, 5 and 6 are similar longitudinal sections of the three modified constructions.

The modification shown in FIGURE 4 only differs from the guide device above described in that the internal threads in the parts 11 and 12 of FIGURE 1 are made in a single piece marked 24.

Figure 5:
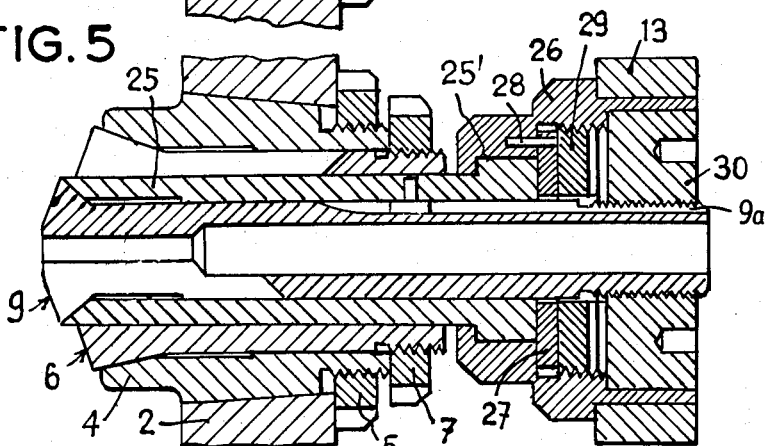

In the modification according to FIGURE 5 the fixed sleeve 25 is provided at its rear end with a cylindrical shoulder 25', upon which is rotatably mounted a hollow part 26 with a stepped bore. Against the shoulder of the bore is fixed a disc 27 by means of pins 28 and a threaded washer 29 threaded into a threaded part of the bore so that the hollow part 26 can rotate upon the sleeve 25 without the possibility of axial displacement thereon. In a rear counterbore in the hollow part 26 is lodged a cylindrical nut 30 which is threaded on the rear threaded end of the hollow member 9. This nut 30 is fixed in the hollow part by means of the split ring 13 just as in FIGURE 3, this ring contracting, when it is tightened by the bolt 14 (see FIGURE 1), the thin cylindrical wall on which it is set and thus locking the nut 30 in the hollow part.

When the ring 13 is caused to make an angular movement under the action of the cam 21 as described above the nut 30 to which this angular movement is imparted gives rise to a longitudinal movement of the sliding member 9 within the sleeve 25 because the hollow part 26 cannot itself perform a longitudinal movement in relation to the sleeve 25, the guide collet 9' thus being open or closed according to the direction of angular movement of the assembly 25, 30 and 13.

Figure 6:
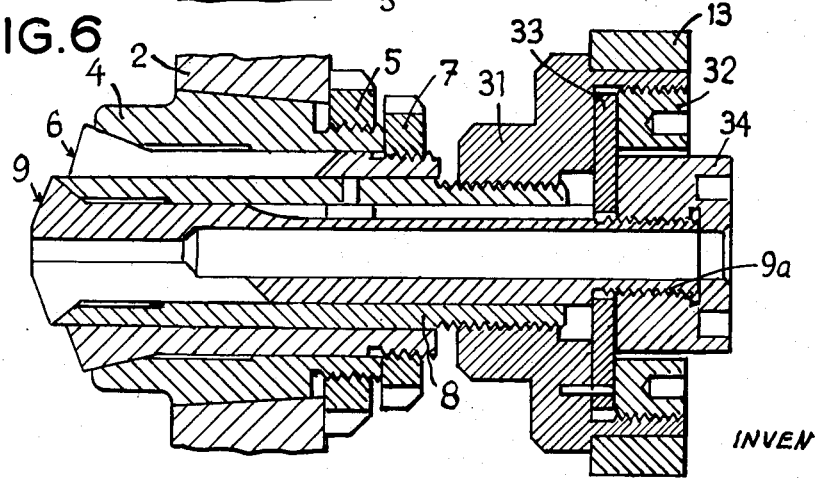

In the modification according to FIGURE 6 a hollow part 31 again has a threaded bore by means of which it is threaded to the rear threaded end of the sleeve 8 and it also has a threaded bore at the rear end and in which is engaged a hollow screw 32 which clamps a disc 33 against the shoulder formed at the junction between the bores in the hollow part 31. On the rear threaded end of the hollow member 9 is threaded an apertured cap nut 34 between which and a shoulder at the rear end of the hollow member 9 the central part of the disc 33 is retained in such a way that it can rotate when the hollow part 31 is rotated from the cam shaft as above described in order to move the hollow member 9 forwards or backwards to open or close the guide collet 9' integral with the hollow member, by the action in this case of the threads on the rear end or the sleeve 8.

What we claim is:

1. A guiding device for guiding a work bar and adapted to be mounted on an automatic lathe having a moving headstock and having a support for tool holders which are operated by means of cams on a cam shaft which rotates to effect a cycle of machining operations, said guiding device comprising a fixed sleeve member adapted to be mounted on said support, a hollow member slidable in said sleeve member, a guide collet formed at the forward end of said hollow member for guiding the work bar, cooperating formations in said sleeve member and on said collet whereby the collet can be closed into guiding position and opened by longitudinal movement of said hollow member in relation to said sleeve member, a rotatable operator coupled to the rear ends of said sleeve member and said hollow member for effecting the longitudinal movement of said hollow member in relation to said sleeve member, a rocker coupled at one end to said rotatable operator and adapted to be coupled at the other end to a cam on said cam shaft, the action of said cam on the rocker causing said rotatable operator to rotate in such direction as to open said guide collet, a return spring which rotates said operator in the opposite direction and thereby causes said guide collet to close when said cam moves out of action, and stop means limiting the closing action of said guide collet.

2. A device according to claim 1 also including a split ring clamped upon said rotatable operating member, an arm on said split ring, and a pin and slot connection between said arm and said one end of said rocker.

3. A guiding device for guiding a work bar and adapted to be mounted on an automatic lathe having a moving headstock and having a support for tool holders which are operated by means of cams on a cam shaft which rotates to effect a cycle of machining operations, said guiding device comprising a fixed sleeve member adapted to be mounted on said support, a hollow member slidable in said sleeve member, a guide collet formed at the forward end of said hollow member for guiding the work bar, cooperating formations on said sleeve member and on said collet whereby the collet can be closed into guiding position and opened by longitudinal movement of said hollow member in relation to said sleeve member, a rotatable operator comprising a nut having two internal threads of different pitch which are threadedly engaged with the rear ends of said sleeve member and said hollow member for effecting the longitudinal movement of said hollow member in relation to said sleeve member, a rocker coupled at one end of said rotatable operator and adapted to be coupled at the other end to a cam on said cam shaft, the action of the cam on said rocker causing said rotatable operator to rotate in one direction such that the guide collet opens, a return spring coupled to said rocker which rotates the rocker and operator in the opposite direction and thereby causes said guide collet to close when said cam moves out of action, and stop means limiting the closing action of said guide collet.

4. A device according to claim 3 in which the part of the nut member in which the internal thread engaging the threads on the rear end of the hollow member is formed, is a separate piece within the remainder of the nut, and an external clamping member locking said separate piece in said nut.

5. A guiding device for guiding a work bar and adapted to be mounted on an automatic lathe having a moving headstock and having a support for tool holders which are operated by means of cams on a cam shaft which rotates to effect a cycle of machining operations, said guiding device comprising a fixed sleeve member adapted to be mounted on said support, a hollow member slidable in said sleeve member, a guide collet formed at the forward end of said hollow member for guiding the work bar, cooperating formations on said sleeve member and said collet whereby the collet can be closed into guiding position and opened by longitudinal movement of said hollow member in relation to said sleeve member, a rotatable operator in threaded engagement with the rear end of one of said members and in rotatable engagement and restrained against axial movement with respect to the other of said members for effecting the longitudinal movement of said hollow member in relation to said sleeve member, a rocker coupled at one end of said rotatable operator and adapted to be coupled at the other end to a cam on said cam shaft, the action of the cam on said rocker causing said rotatable operator to rotate in one direction such that the guide collet opens, a return spring coupled to said rocker which rotates the rocker and operator in the opposite direction and thereby causes said guide collet to close when said cam moves out of action, and stop means limiting the closing action of said guide collet.

6. A device according to claim 5 in which a cylindrical shoulder is formed in the rear end of said sleeve member and in which the rotatable operator comprises a hollow part rotatable and fixed against axial displacement in relation to said shoulder and a nut fixed in the hollow part and engaging external threads on the rear end of said hollow member.

7. A device according to claim 5 in which the rear ends of the sleeve member and the hollow member are threaded and said rotatable operator comprises a hollow part one end of which is in threaded engagement with the rear end of the sleeve member, a disc secured in the hollow part projecting inwardly, a shoulder formed on the rear portion of said hollow member behind which said disc extends, said device also including an apertured cap nut threaded on to the thread on the rear end of said hollow member and retaining said disc between itself and said shoulder without impeding rotation of said hollow part.

References Cited in the file of this patent

UNITED STATES PATENTS

| | | |
|---|---|---|
| 1,823,537 | Gaudreau | Sept. 15, 1931 |
| 2,373,155 | White | Apr. 10, 1945 |
| 2,619,863 | Bechler | Dec. 2, 1952 |

FOREIGN PATENTS

| | | |
|---|---|---|
| 512,076 | Great Britain | Aug. 29, 1939 |